United States Patent Office 3,458,554
Patented July 29, 1969

3,458,554
FLUORINATED ORGANOSILICON COMPOUNDS
Loren A. Haluska, Midland, Mich., assignor to Dow Corning Corporation, Midland, Mich., a corporation of Michigan
No Drawing. Filed June 16, 1965, Ser. No. 464,552
Int. Cl. C07f 7/02, 7/04
U.S. Cl. 260—448.2  4 Claims

ABSTRACT OF THE DISCLOSURE

There is provided by the invention an organosilicon compound of the formula

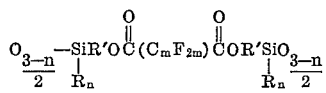

where

R is selected from the group consisting of monovalent hydrocarbon and halohydrocarbon radicals, divalent hydrocarbon and halohydrocarbon radicals having both valences bonded to silicon atoms, the hydroxyl group, hydrogen, and hydrolyzable groups,
R' is selected from the group consisting of methylene, ethylene, propylene, and arylene radicals,
$m$ has an average value of 1 to 20, and
$n$ has an average value of from 0 to 3.

The organosilicon compounds are useful as water and oil repellents, protective coatings, and lubricants.

---

This application relates to new organsilicon compounds which are useful as water and oil repellents, protective coatings and lubricants.

The new compounds of this invention comprise at least one unit of the formula

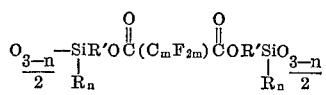

where

R is selected from the group consisting of monovalent hydrocarbon and halohydrocarbon radicals, divalent hydrocarbon and halohydrocarbon radicals having both valences bonded to silicon atoms, the hydroxyl group, hydrogen, and hydrolyzable groups,
R' is selected from the group consisting of methylene, ethylene, propylene, and arylene radicals,
$m$ has an average value of 1 to 20, and
$n$ has an average value of from 0 to 3.

R can be any monovalent hydrocarbon radical, e.g. alkyl and cycloalkyl radicals such as methyl, isopropyl, sec-hexyl, octyl, octadecyl, and cyclohexyl; aliphatically unsaturated radicals such as vinyl, ethynyl, allyl, cyclopentenyl, and 3-octenyl; and aryl-containing radicals such as phenyl, tolyl, benzyl, xenyl, or naphthyl.

R can also be any monovalent halohydrocarbon radical such as 3,3,3-trifluoropropyl, 4,5-dichlorooctyl, bromocyclohexenyl, 3-chloroallyl, dibromophenyl, α,α,α-trifluorotolyl, and fluoroxenyl.

R can further be any divalent hydrocarbon or halohydrocarbon radicals, e.g. methylene, dimethylene,

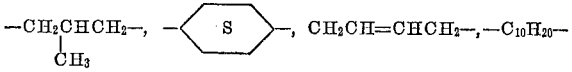

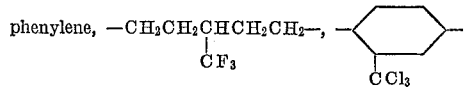

and

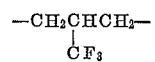

Both valences are bonded to silicon atoms, for example ≡SiCH₂CH₂Si≡.

R can also be any hydrolyzable group, i.e., any silicon-bonded radical that reacts with water to form a silanol group. Examples are halogens such as chlorine and bromine; alkoxy groups such as methoxy, ethoxy, β-chloroethoxy, isopropoxy, and hexoxy; alkoxyalkoxy groups such as β-ethoxyethoxy, β-methoxyethoxy, and β-methoxypropoxy; acyloxy groups such as formate, acetate, trifluoroacetate, and butyrate; a ketoxime derivative such as

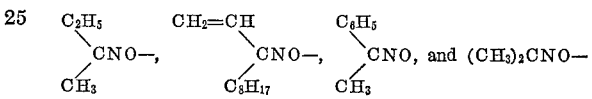

amino groups such as —NH₂, methylamino, dimethylamino, and oxyamino radicals such as —ON(CH₃)₂, etc., and the isocyanate radical.

R' can be any methylene, ethylene, propylene, or arylene radical such as phenylene, xenylene, or

In addition, this application relates to an organosilicon compound consisting essentially of at least one unit of the formula

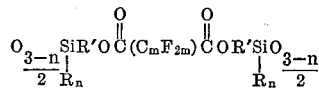

any other units present being of the formula

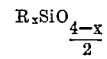

where

R is selected from the group consisting of monovalent hydrocarbon and halohydrocarbon radicals, divalent hydrocarbon and halohydrocarbon radicals having both valences bonded to silicon atoms, the hydroxyl group, hydrogen, and hydrolyzable groups,
R' is selected from the group consisting of methylene, ethylene, propylene, and arylene radicals,
$m$ has an average value of 1 to 20,
$n$ has an average value of from 0 to 3 and
$x$ has an average value of 0 to 3.

Examples of R and R' are listed above.

The compositions of this invention can be monomers such as:

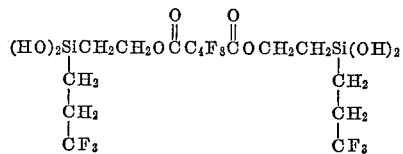

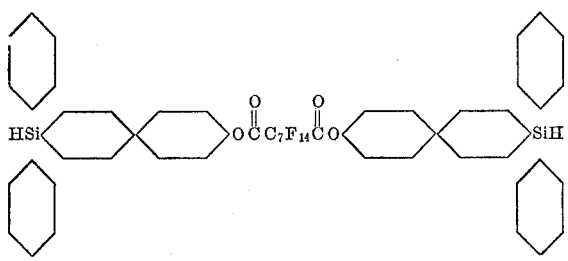

or

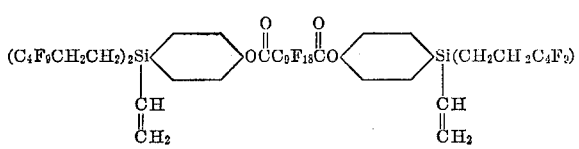

They can also be homopolymers such as

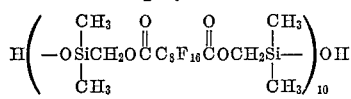

and copolymers such as

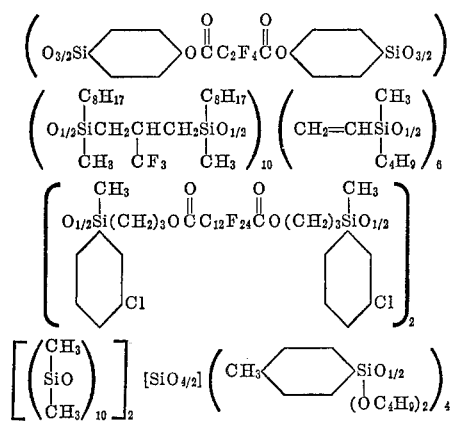

and

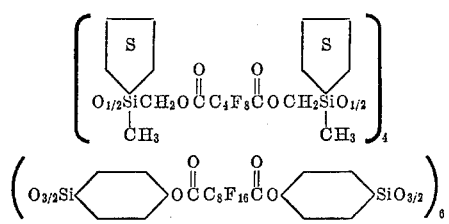

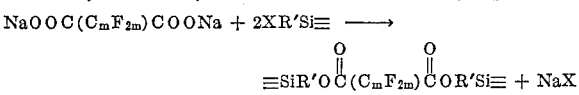

The compounds of this invention can be made in a number of ways. One way is to react the sodium or silver salt of a perfluorodicarboxylic acid with an organosilicon compound containing XR′Si≡, where X is chlorine, bromine, or iodine, and R′ is defined above, e.g.:

NaOOC(C_mF_{2m})COONa + 2XR′Si≡ ⟶
≡SiR′OC(C_mF_{2m})COR′Si≡ + NaX

This reaction proceeds well at temperatures around 100° C. It is often desirable to run the reaction in a suitable dispersing agent such as N,N-dimethylformamide, dibutylether, diethylketone, dimethylsulfoxide, or toluene.

Another method of preparing the compositions of this invention is illustrated by Example 1 below.

A third method involves the addition of bisunsaturated esters such as the diallyl or divinyl esters of perfluorodicarboxylic acids, with ≡SiH compounds in the presence of addition catalysts such as chloroplatinic acid. This method is illustrated in Example 3.

The following examples are illustrative only and should not be construed as limiting the invention which is properly delineated in the appended claims.

Example 1

To 31.2 g. of perfluorosuccinic acid there was added 36.1 g. of

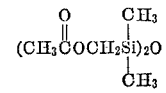

and 0.2 g. of sulfuric acid. This mixture was heated at 86° to 91° C. under a vacuum for 253 hours to yield a viscous polymer of the unit formula

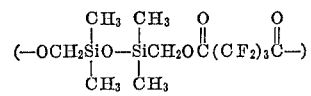

The viscosity of the polymer at 25° C. was 297.5 cs., and the refractive index at 25° C. was 1.4111.

Example 2

When 10 g. of

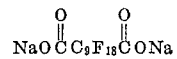

is reacted with 1 g. of p-bromophenyldiphenylacetoxysilane at 100° C. in 20 g. of ethyleneglycoldimethylether, a product is formed which is hydrolyzable to yield a polymer of the unit formula

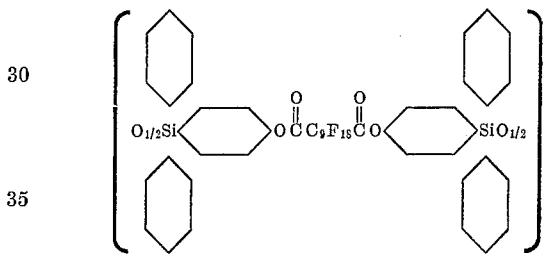

Example 3

When 10 g. of the diallyl ester of HOOC(C_7F_{14})COOH is reacted at 80° C. with 2 g. of 3,3,3-trifluoropropylmethylchlorosilane in the presence of chloroplatinic acid, the product

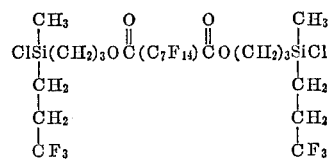

is formed.

When equimolar amounts of the above product and

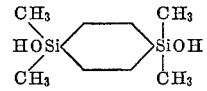

are mixed, a polymer consisting essentially of

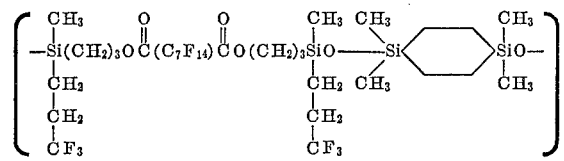

units is formed.

That which is claimed is:

1. An organosilicon compound of the unit formula

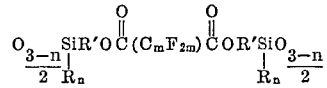

where

R is selected from the group consisting of monovalent hydrocarbon and halohydrocarbon radicals, divalent hydrocarbon and halohydrocarbon radicals having both valences bonded to silicon atoms, the hydroxyl group, hydrogen, and hydrolyzable groups, R' is selected from the group consisting of methylene, ethylene, propylene, and arylene radicals, $m$ has an average value of 1 to 20, and $n$ has an average value of from 0 to 3.

2. An organosilicon compound consisting essentially of at least one unit of the formula

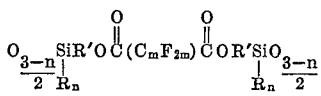

the remaining units present being of the formula

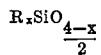

where

R is selected from the group consisting of monovalent hydrocarbon and halohydrocarbon radicals, divalent hydrocarbon and halohydrocarbon radicals having both valences bonded to silicon atoms, the hydroxyl group, hydrogen, and hydrolyzable groups, R' is selected from the group consisting of methylene, ethylene, propylene, and arylene radicals, $m$ has an average value of 1 to 20, $n$ has an average value of from 0 to 3 and $x$ has an average value of 0 to 3.

3. A compound in accordance with claim 1 where R is methyl, R' is methylene, $m$ has a value of 1 and $n$ has a value of 2.

4. A compound in accordance with claim 2 where R is methyl, R' is methylene, $m$ has a value of 1 and $n$ has a value of 2.

References Cited

UNITED STATES PATENTS

| | | | |
|---|---|---|---|
| 3,347,794 | 10/1967 | Kawahara | 260—448.2 XR |
| 3,371,104 | 2/1968 | Rossmy et al. | 260—448.2 XR |
| 3,161,664 | 12/1964 | Depree | 260—429.7 XR |
| 3,249,464 | 5/1966 | Nelson et al. | 117—76 XR |

TOBIAS E. LEVOW, Primary Examiner

J. P. PODGORSKI, Assistant Examiner

U.S. Cl. X.R.

106—2, 13; 252—49.6; 260—448.8